(12) United States Patent
Nishida (10) Patent No.: US 6,297,787 B1
(45) Date of Patent: *Oct. 2, 2001

(54) DISPLAY DEVICE (75) Inventor: Shinsuke Nishida, Tokyo (JP)

(73) Assignee: Fourie, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/894,883

(22) PCT Filed: Jan. 11, 1996

(86) PCT No.: PCT/JP96/00058

§ 371 Date: Aug. 29, 1997

§ 102(e) Date: Aug. 29, 1997

(87) PCT Pub. No.: WO97/25705

PCT Pub. Date: Jul. 17, 1997

(51) Int. Cl.[7] .................... G09G 5/00; G09G 3/36
(52) U.S. Cl. ............ 345/1.3; 345/205; 345/206; 345/90
(58) Field of Search .................. 345/205, 206, 345/90, 903, 1.3; 340/815.4, 815.47, 815.73, 815.74

(56) References Cited

U.S. PATENT DOCUMENTS

| | | | |
|---|---|---|---|
| 5,523,769 | * | 6/1996 | Lauer et al. .................. 345/1 |
| 5,657,046 | * | 8/1997 | Noble et al. ................ 345/123 |
| 5,712,655 | * | 1/1998 | Noble et al. ................ 345/123 |
| 5,796,376 | * | 8/1998 | Banks ........................... 345/82 |

FOREIGN PATENT DOCUMENTS

| | | |
|---|---|---|
| 2102546 | 8/1977 | (JP) . |
| 2264995 | 2/1990 | (JP) . |
| 3264989 | 11/1991 | (JP) . |
| 493983 | 3/1992 | (JP) . |
| 537773 | 2/1993 | (JP) . |

* cited by examiner

Primary Examiner—Jeffery Brier
Assistant Examiner—Anthony J. Blackman
(74) Attorney, Agent, or Firm—Ladas & Parry (57) ABSTRACT

In a display device, wiring for the respective display elements is simplified so that the assembling work and the maintenance work become easy. A large number of display units (50) are arranged in length and breadth directions to form the display device. Each display unit comprises a display element (10) comprised of a light bulb, a regulator (51) comprised of a relay, a non-volatile memory (52) comprised of an EEPROM and a controller (53) including a CPU. For these display units (50), a passage (61) for power supply and a passage (71) for supply of synchronizing signal are drawn. Display information to designate change of display mode in time of light emitting or non-light emitting (ON/OFF) state are stored in memories within the respective display units. The controllers of the respective display units carry out ON/OFF control of regulators on the basis of the display information in synchronism with the synchronizing signal to turn ON or OFF the display elements. If a rewrite signal is delivered to the signal transmission passage, the contents of the respective memories can be also rewritten.

23 Claims, 6 Drawing Sheets

Fig.1

PRIOR ART

| DISPLAY INFORMATION | 1 | 0 | 1 | 0 | 0 | 1 | 1 | 1 |
|---|---|---|---|---|---|---|---|---|
| STATE OF LIGHT BULB | ON | OFF | ON | OFF | | ON | | |

↔ 1sec

PRIOR ART

Fig.12

DISPLAY DEVICE

TECHNICAL FIELD

The present invention relates to a display device, especially to a type of display which is attached on a wall, such as an electric bulletin board, an advertisement sign board or the like.

BACKGROUND ART

Wall display devices, such as electric bulletin boards and advertisement sign boards, are widely used as means for providing information to many and unspecific people on streets. Such a wall display device usually includes a number of display elements arranged on a plane in which an individual element is used for one pixel. The respective display elements are electrically actuated in various manner to display information. In an electric bulletin board, for example, one light bulb is used as one display element for one pixel, and a plurality of light bulbs are arranged in matrix. By illuminating those of the light bulbs in specified positions, it is possible to display letters and pictures. Recently electric bulletin boards using light emitting diodes in place of the light bulbs are widely used.

An advertisement sign board uses "panel display elements" as display elements constituting respective pixels. The "panel display elements" are not light emitting themselves but have a plurality of display faces only one of which is actually displayed. Usually one of the display faces to be displayed can be selected by using a rotary mechanism, such as a motor or the like. One display face is selected for each pixel, whereby letters or pictures can be displayed.

The display elements for respective pixels, which are thus provided by light bulbs, light emitting diodes, panel display elements or the like, are electrically actuated. The light bulbs and the light emitting diodes, for example, can be switched between their light emitting state and non-light emitting state by On/Off control of electric power supply. By conducting the On/Off control on the respective light bulbs or the respective light emitting diodes providing the respective pixels, only required pixels can be selectively illuminated, whereby required information can be displayed. In the panel display elements the On/Off control of electric power supply to the motor is conducted, whereby those of the display faces to be actually displayed can be selected. The On/Off control is conducted on the respective panel display elements providing the respective pixels, whereby a required display face for each pixel can be displayed and required information can be displayed.

In the above-described display devices, needless to say, larger numbers of pixels are necessary for improvement of their display resolution. Accordingly it is necessary that a large number of display elements for respective pixels are arranged in a matrix. As described above, since display manners of the respective display elements must be controlled by electric power supply, it is needed to provide an individual electric power supply line for the individual display elements. In an electric bulletin board having 100 light bulbs arranged in a matrix, for example, two electric power supply lines are needed for each of the 100 light bulbs, and therefore totally 200 lines must be wired from a switchboard to the light bulbs. For high resolution a lager number of light bulbs must be arranged, which increases a number of wiring lines. When a number of wiring lines becomes increased, a structure of a display device becomes complicated, which need much labor for its manufacture and maintenance. This results in higher manufacturing costs and maintenance costs.

A display device for solving such problems is disclosed in the International Application No. PCT/JP95/00901 based on the Patent Cooperation Treaty. In this display device, addresses are defined for every respective display elements and an addressed signal is delivered to a common signal line to thereby independently control the respective display elements thus to simplify wiring. This invention proposes a different technique for simplifying wiring for the respective display elements to facilitate the assembling work and the maintenance work.

DISCLOSURE OF INVENTION (1) The first feature of the present invention resides in a display device including plural display elements which are arranged in a matrix and have a function to vary display mode corresponding to one pixel by supplying an electric power, the display device comprising:

a plurality of display units each including a display element, a regulator for controlling electric power supply to the display element, memory means for storing display information to instruct the display element to change display mode in time and a controller for controlling the regulator on the basis of the display information stored in the memory means;

a device casing for accommodating and fixing the plurality of display units so that the respective display elements are arranged on a predetermined display screen in a manner adjacent to each other;

an electric power source for producing electric power which is supplied to the display elements; and electric power transmission means for delivering electric power produced in the electric power source to the regulators within the respective display units, in the state where the respective display units are accommodated within the device casing.

(2) The second feature of the present invention resides in a display device having the first feature:

wherein plural display elements are respectively provided within each of the display units; and wherein display information for the respective plural display elements are stored in the memory means.

(3) The third feature of the present invention resides in a display device having the first or second feature:

wherein one display element is constituted by three color presentation elements of a first color presentation element for presenting first primary color R by supplying electric power, a second color presentation element for presenting second primary color G by supplying electric power and a third color presentation element for presenting third color B by supplying electric power.

(4) The fourth feature of the present invention resides in a display device having the first to third feature:

wherein there are further provided;

a central control device for generating a predetermined synchronizing signal delivered to the respective display units; and signal transmission means for delivering the synchronizing signal generated in the central control device to the controllers within the respective display units;

wherein the respective controllers have a function to control the regulators at timings synchronized with the synchronizing signal delivered thereto.

(5) The fifth feature of the present invention resides in a display device having the first to third feature:

wherein there are further provide;

a central control device for generating a predetermined write signal delivered to the respective display units; and signal transmission means for delivering the write signal generated in the central control device to the controllers within the respective display units;

wherein the respective controllers have a function to carry out rewrite operation of display information stored in the memory means on the basis of the write signal delivered thereto.

(6) The sixth feature of the present invention resides in a display device having the fifth feature:

wherein unique address information for the respective display units are stored in the respective memory means;

wherein the write signal comprises address information indicating a specific display unit and display information to be newly written into the memory means within said specific display unit; and wherein the respective controllers have a function to replace display information stored in the memory means by display information within the write signal when address information stored in the memory means and address information within the write signal correspond to each other.

(7) The seventh feature of the present invention resides in a display device having the first to third feature:

wherein there are further provided;

a central control device for generating a predetermined write signal delivered to the respective display units; and signal transmission means for delivering the write signal generated in the central control device to the controllers within the respective display units;

wherein control programs are respectively stored in the memory means of the display units to allow the controllers to be operative by making reference to the control programs; and wherein the respective controllers have a function to rewrite the control program stored in the memory means on the basis of the write signal delivered thereto.

(8) The eighth feature of the present invention resides in a display device having the seventh feature:

wherein unique address information for the respective display units are stored in the respective memory means;

wherein the write signal comprises address information indicating a specific display unit and control program to be newly written into the memory means within said specific display unit; and wherein the respective controllers have a function to replace control program stored in the memory means by control program within the write signal when address information stored in the memory means and address information within the write signal correspond to each other.

(9) The ninth feature of the present invention resides in a display device having the fourth to eighth feature:

wherein electric power transmission means and signal transmission means are constituted by a same conductive wire to supply electric power through the conductive wire and to superimpose a component of a signal on voltage of the electric power so that said signal is also transmitted through said conductive wire.

(10) The tenth feature of the present invention resides in a display device having the first to ninth feature:

wherein a signal to be transmitted by the signal transmission means is compressed or encoded in the central control device and the compressed or encoded signal is expanded or decoded within the controller.

(11) The eleventh feature of the present invention resides in a display device having the second to tenth feature:

wherein the controller carries out thinning processing or interpolation processing with respect to display information stored in the memory means.

A display device according to this invention is constituted by providing an array of plural display units within a device casing. Each display unit includes at least one display element (which carries out display as a pixel), a regulator for controlling supply state of electric power with respect to this display element, a memory, and a controller. For example, the display element is constituted by a light bulb and the regulator is constituted by a relay provided on an electric power transmission passage to the above-mentioned light bulb. In this example, the controller controls the relay to switch the light emitting on or off of the light bulb. Instructions (commands) for the controller are stored as display information in the memory. This display information is information for instructing the respective display elements to change the display mode along time axis. In the above-described example where each display element is constituted by the light bulb and the light emitting or non-light emitting state of this light bulb is switched, it is sufficient to prepare display information of the light emitting or non-light emitting (ON/OFF) state for every unit time which is represented by data of one bit. Assuming that the unit time is one second, a bit data of logic "1" indicates light emitting (ON) state and a bit data of logic "0" indicates non-light emitting (OFF) state, display information of 8 bits expressed as "10100111" in the memory instructs the light bulb to carry out such an operation that it is turned ON for 1 sec., is turned OFF for 1 sec., is turned ON for 1 sec., is turned OFF for 2 sec., and is turned ON for 3 sec.

The feature of the display device according to this invention resides in that individual display units respectively include display information designating (indicating) own display operations as stated above, and the respective display units thus independently carry out display operations. When only electric power is supplied to the device, it can operate even if no instruction (command) is given from the external. Accordingly, if power supply is carried out by way of the common power transmission passage, the respective display units can start independent display operations without giving any signal from the external. In other words, in the display device according to this invention, since individual display units have intelligence function, if power supply is carried out with respect to all display units, predetermined display operations can be made. When the common power transmission passage is used, even if the number of display units is increased, necessary number of wirings is invariant, so the entire wiring extremely becomes simplified. In addition, since the respective display units are operative on the basis of display information respectively stored in the memories, if predetermined display information are stored in advance in the memories of the respective display units, it is possible to freely set desired display operations.

If plural display units are arranged in longitudinal and lateral directions to constitute a display screen composed of a large number of pixels with respective one display element being as one pixel, it is possible to display arbitrary picture (picture image) on this display screen. Particularly, if display elements corresponding to three primary colors of R, G and B are used, it is possible to form color display screen. Moreover, if a synchronizing signal generated at the central control device is delivered to respective controllers within the respective display units, timings at which display modes of plural display units change can be synchronized with each other. Alternatively, if a predetermined write signal is delivered in place of the synchronizing signal to rewrite the contents of the memories within the respective display units on the basis of information included in the write signal, it is possible to display any picture on demands. It is to be noted that when addresses are defined for respective display units, it becomes possible to deliver a specific write signal only to an addressed specific display unit even if a common signal transmission passage is used.

Further, if a control program for the controller is stored in the memory, change of the operation can be flexibly carried out by rewriting the control program. In addition, if the controller is caused to have arithmetic processing function, it can execute compression or expansion of data, encode or decode thereof and thinning processing or interpolation processing of pixels.

BEST MODE FOR CARRYING OUT THE INVENTION

§0. Conventional Electric Bulletin Board

The present invention will be explained based on an embodiment shown in drawings attached hereto. First, for comparison of the conventional electric bulletin board with the present invention, the structure of the conventional, general electric bulletin board will be explained with reference to FIG. 1. In the conventional electric bulletin board, respective display elements 10 are provided by light bulbs. In this example, display elements 10 are arranged in a five by ten matrix and housed in a device casing 20. A switchboard 30 is provided for supplying electric power to these fifty display elements (light bulbs) 10, and central control device 40 is provided for giving commands to the switchboard 30. Two electric power supply lines 31 are wired to each of the display elements 10 (only a part of the wiring is shown to simplify the drawing). The central control device 40 gives to the switchboard 30 commands as to which display elements 10 are to be electrically activated, based on the information to be displayed (e.g., letters) on this electric bulletin board. Based on the commands, the switchboard 30 supplies electric power to only those of the electric power supply lines 31 associated with the required display elements 10. Only required display elements 10 are thus lit, and information is displayed by using the respective display elements 10 as individual pixels.

Figure 1:
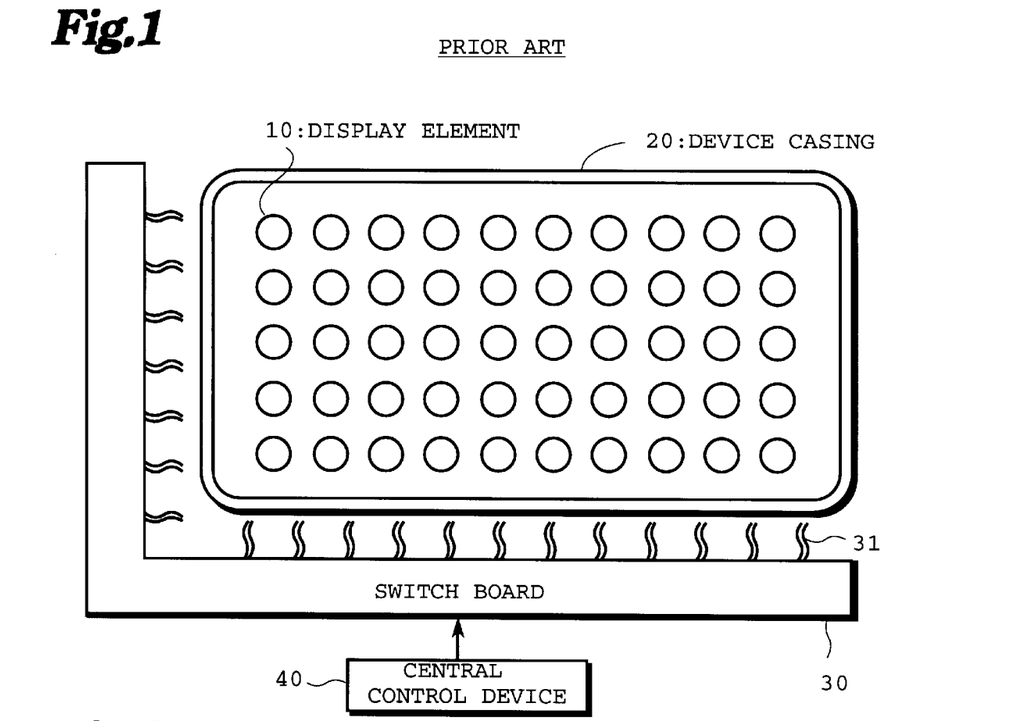
FIG. 1 is a front view showing the configuration of a conventional typical electric bulletin board.

As described above, such a conventional electric bulletin board, however, has the problem that the wiring is very complicated. In the example of FIG. 1, two electric power supply lines are necessary for each of the fifty display elements 10, and therefore totally a hundred electric power supply lines have to be wired. In practical purposes, high resolutions are necessary to display complicated letters and pictures, which needs more display elements 10 so that the wiring becomes more complicated.

The present invention is to provide a technical idea which can avoid such complicated wiring.

§1. Fundamental Embodiment of the Present Invention

Figure 2:
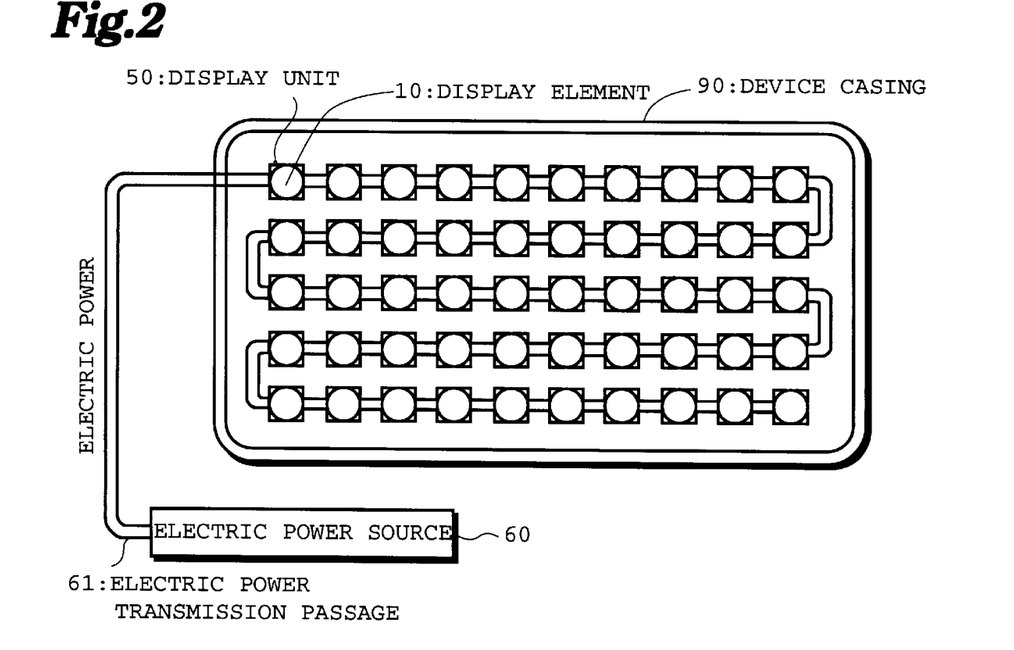
FIG. 2 is a front view showing the configuration of a display device according to the fundamental embodiment of this invention.

FIG. 2 is a front view showing the fundamental embodiment to which the present invention is applied to the above-described electric bulletin board. In this electric bulletin board, individual display elements 10 (light bulbs) are respectively accommodated within display units 50. Similarly to the electric bulletin board of FIG. 1, the respective display units 50 are adjacently arranged in a matrix form of five by ten, and are housed and fixed within a device casing 90. On the other hand, an electric power source 60 is provided for the purpose of generating electric power delivered to these respective display units 50, and electric power generated at the electric power source 60 is delivered to the respective display units 50 through an electric power transmission passage 61.

The important point in this case is that the electric power transmission passage is a transmission passage common to the respective display units 50. In other words, the electric power transmission passage 61 is constituted as a single transmission passage to take a route successively including the first display unit 50, the second display unit 50, the third display unit 50, . . . , the 49-th display unit 50 and the 50-th display unit 50. In more practical sense, when two wirings are drawn into the device casing 90 as the electric power transmission passage 61, all wirings are completed. Accordingly, the wiring is extremely simplified as compared to the conventional electric bulletin board shown in FIG. 1. In addition, even if the number of display units 50 is increased for the purpose of improving the resolution, it is still sufficient to provide two wirings in total.

Figure 3:
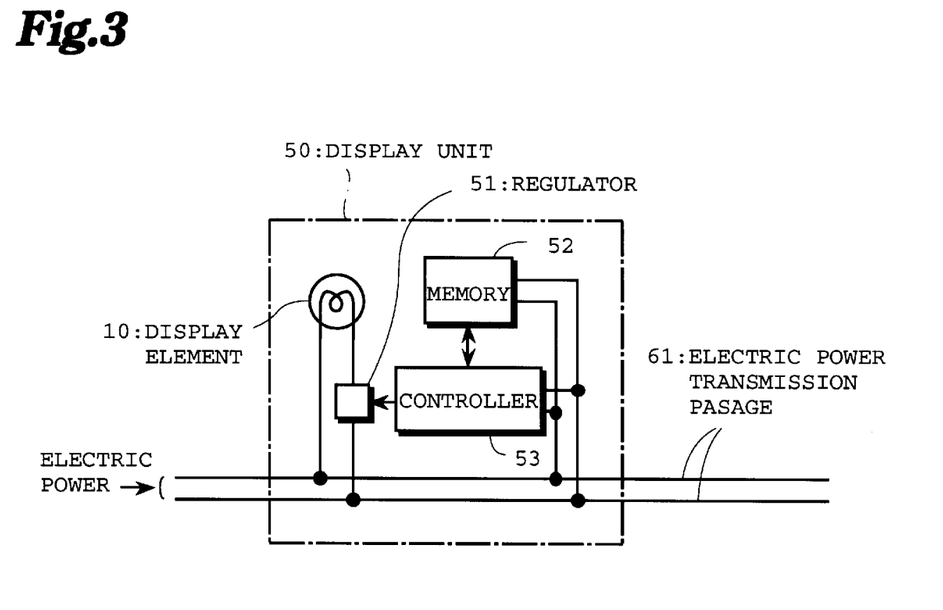
FIG. 3 is a circuit diagram of each display unit 50 used in the electric bulletin board shown in FIG. 2.

In order to allow the respective display units 50 to carry out their own individual operations while taking such a structure in which electric power is supplied by the common electric power transmission passage 61, additional components are required to be added to the display elements 10 within the respective display units 50. FIG. 3 is a circuit diagram showing an example of the configuration within one display unit 50. A light bulb as the display element 10 is connected to the electric power transmission passage 61 drawn within the device casing 90 so that the electric power is supplied. In this case, one terminal of the display element 10 is connected to the electric power transmission passage 61 through a regulator 51. Thus, supply state of the electric power to the display element 10 can be controlled by this regulator 51. In more practical sense, the regulator 51 is constituted by a relay, and is capable of carrying out ON/OFF control of power supply to the display element 10 (light bulb). Within the display unit 50, a non-volatile memory 52 and a controller 53 are further provided. Display information for instructing the display element 10 (light bulb) to change its display mode in point of time is stored in the non-volatile memory 52. The controller 53 gives instruction to the regulator 51 on the basis of this display information to carry out ON/OFF control of the display element 10.

Figure 4:
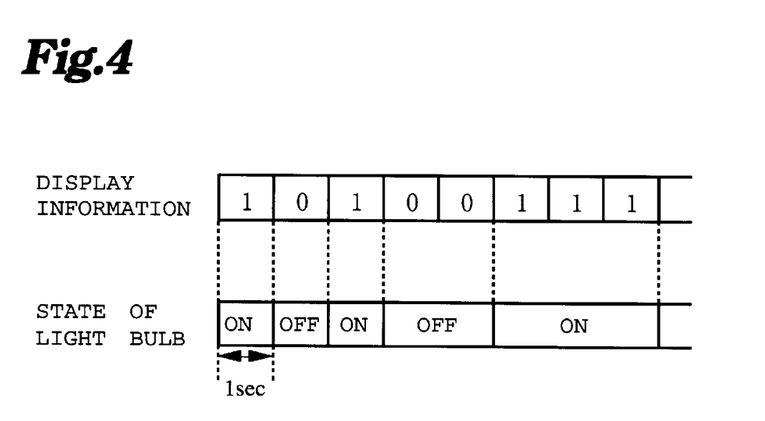
FIG. 4 is a Table showing display information stored in memory 52 of the display unit 50 shown in FIG. 3 and the state of light bulb corresponding thereto.

FIG. 4 is a Table showing the relationship between an example of display information stored in the non-volatile memory 52 and the state of the light bulb corresponding to this display information. In this example, one second is defined as a unit time and display information, which indicates light emitting or non-light emitting (ON/OFF) state for every unit time by a bit data, is shown at the upper row of the Table. Namely, the display information consists of bit train, and an n-th bit indicates the display state after n sec. In more practical sense, a bit "1" is defined as a bit data indicating light emitting (ON) state and a bit "0" is defined as a bit data indicating non-light emitting (OFF) state. The light emitting or non-light emitting (ON/OFF) state of the display element 10 (light bulb) is indicated at the lower row of this Table. When reference is made to corresponding portions of both the upper and lower rows, the relevancy between display information prepared and the actual light emitting or non-light emitting (ON/OFF) operations of the light bulb can be readily understood. The controller 53 sequentially reads out such bit train stored in the memory 52 one bit by one bit every predetermined unit time (1 sec. in this embodiment) to carry out ON/OFF control of the regulator 51 on the basis of the bit value thus read out.

In this configuration, since the individual display units 50 are entirely the same in view of hardware, those display units 50 can be mass-produced. If an EEPROM and a processor unit of the clock included type are respectively used as the non-volatile memory 52 and the controller 53, they can be constituted with elements on one chip. Thus, the structure becomes very simple. In view of software, it is possible to write inherent display information, such as a data indicated at the upper row of FIG. 4, into the non-volatile memories 52 of the individual display units 50 by using the controllers 53 at the final stage when these mass-produced display units 50 are accommodated within the device casing 90. Those display units in which the inherent display information are written can function as an electric bulletin board according to this invention. This assembling work is very easy because the wiring step is simplified to much degree. Similarly, maintenance work also becomes easy.

It is to be noted while, in this embodiment, a data of one bit is used for determining the display state per unit time (1 sec. in this example) to carry out simple ON/OFF control, if, e.g., a data of eight bits is used for determining the display state per unit time, a brightness control with 256 steps of gradation can be also carried out. In this case, it is sufficient that a transistor element, etc. is used as the regulator 51 to vary electric current supply to the display element 10 with 256 steps.

§2 Embodiment Using Synchronizing Signal

In the above-described fundamental embodiment, fifty light bulbs respectively independently carry out light emitting or non-light emitting (ON/OFF) operations. Accordingly, any picture image can be presented on a display screen constituted by the entirety of the display device shown in FIG. 2. As a matter of course, a picture including letters (characters) can be also presented. Further, so-called slide show to switch still pictures every predetermined time can be also presented and moving picture can be also presented. In this case, a number of displaced still pictures or a total display time of the moving picture is limited by capacity of the memory 52. According as the capacity of the memory 52 becomes large, a larger number of still pictures can be presented, and a longer time moving picture display can be made. The pictures presented are determined by display information stored in the memories 52 of the respective display units. In other words, a user of this display device determines in advance what picture is to be presented and stores in advance, in the memories 52 of the respective display units, display information (data of bit train in the above-described example) which is necessary for carrying out such presentation.

It is to be noted that in order to present a meaningful picture when viewed as the entirety of the display device, it is necessary to ensure synchronization between respective display units. Namely, it is necessary to synchronize the timings for switching from a display state corresponding to the n-th bit of the display information indicated at the upper row of FIG. 4 to the next display state corresponding to the (n+1)th bit of the display information with respect to all the display units. If these timings are not in correspondence with each other for the respective display units, it is impossible to display a correct picture. Accordingly, it is preferable to deliver a synchronizing signal to the respective display units.

Figure 5:
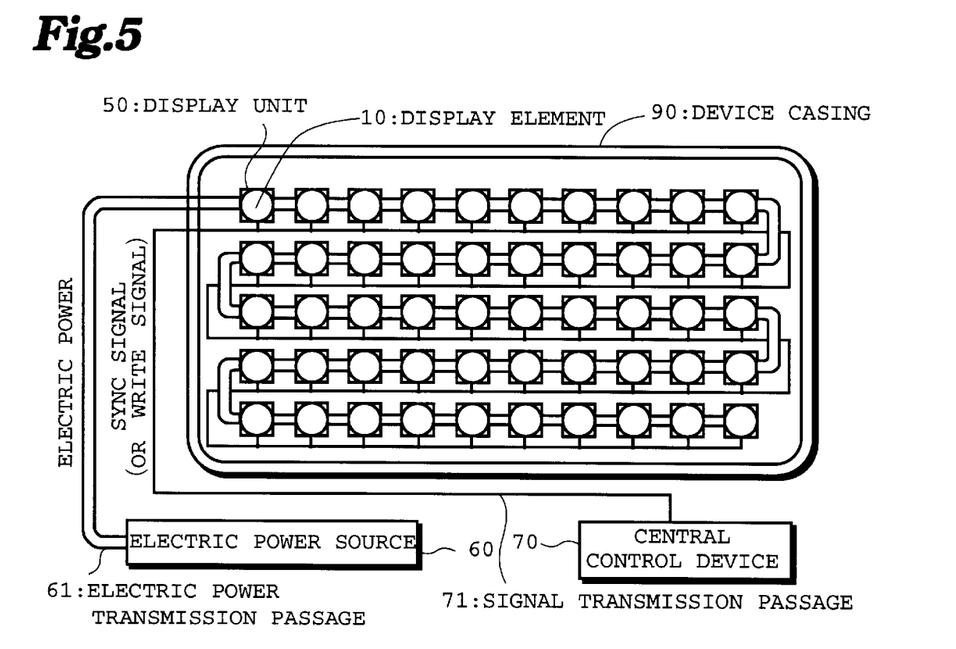
FIG. 5 is a front view showing the configuration of an embodiment in which central control device 70 and signal transmission passage 71 are added to the fundamental embodiment shown in FIG. 2.
Figure 6:
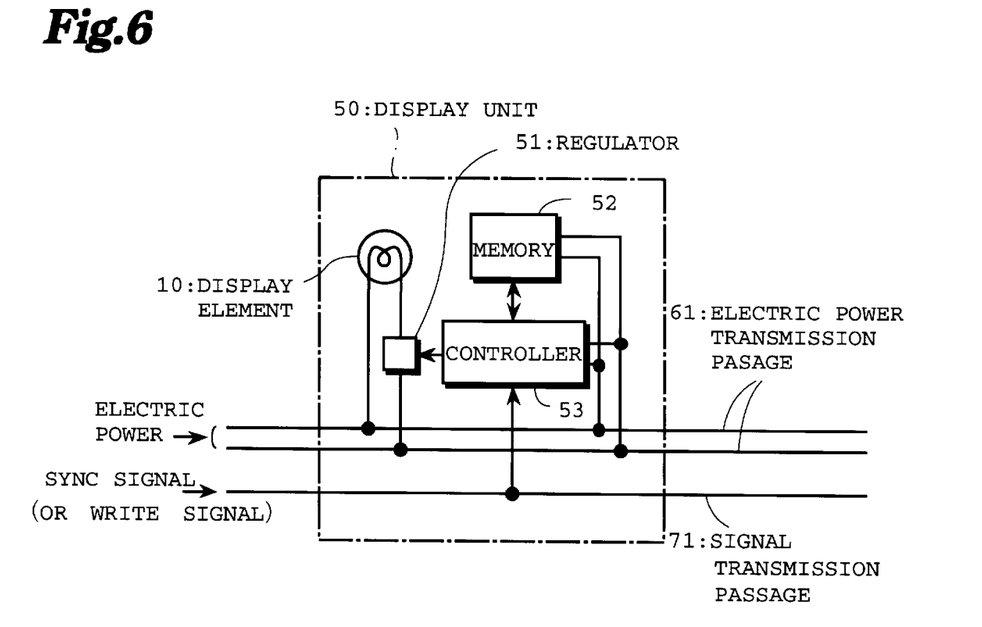
FIG. 6 is a circuit diagram of each display unit 50 used in the electric bulletin board shown in FIG. 5.

FIG. 5 is a front view showing an embodiment in which means for delivering synchronizing signal (SYNC signal) is added to the above-described fundamental embodiment. In this embodiment, central control device 70 and a signal transmission passage 71 are newly provided so that a synchronizing signal generated at the central control unit 70 is transmitted to the respective display units 50 through the signal transmission passage 71. FIG. 6 is a circuit diagram showing an example of the configuration within one display unit 50, wherein the state where the synchronizing signal on the signal transmission passage 71 is taken into the controller 53 is shown. If a clock signal consisting of, e.g., a rectangular wave is used as the synchronizing signal, the controllers 53 of the respective display units can switch the display mode of the display elements 10 at correct timings in correspondence with the period of this clock signal.

It is true that the central control unit 70 and the signal transmission passage 71 are not necessarily required in carrying out this invention. Since it is unnecessary that operation timings of respective display units are precisely synchronized in such cases that random abstract patterns are displayed as a picture image, or in such cases that light is emitted at random as a simple ornament, it is not required to positively use the synchronizing signal. Moreover, when synchronization is taken only at the time of start of the display operation using a start timing of power supply as a trigger, synchronization to a certain extent can be ensured even if a perfect synchronization cannot be attained.

However, it is to be noted that, in the case of displaying letters (characters), etc., it is preferable to use the synchronizing signal as far as possible. From the physical point of view, the electric power transmission passage 61 and the signal transmission passage 71 shown in FIG. 5 may be constituted by the same conductive wire. For example, if a.c. power is used as power delivered, the period of this a.c. power can be utilized as a clock signal. Accordingly, a pair of conductive wires constituting the electric power transmission passage 61 perform the role as the signal transmission passage 71.

§3 Embodiment Using Write Signal

As previously described, the display contents of the electric bulletin board according to the embodiments mentioned above are determined on the basis of display information (bit train data) stored in the memories 52 within the respective display units. In other words, in these electric bulletin boards, only pictures represented by display information stored in the memories 52 can be displayed. In the case of allowing the electric bulletin board to display different pictures, display information in the memories 52 must be changed. As a method for carrying out change of display information, there are a first method of exchanging the entirety of the hardware of the memory 52, and a second method of rewriting the memory content in terms of software. While the first method is also actually effective in such a case that the same advertisement is repeatedly displayed for a long time, the second method is practical from a general point of view. In view of the above, the embodiment having a function to rewrite display information in the memory 52 will now be described.

Such a rewrite operation can be carried out by delivering a write signal, in place of a synchronizing signal, through the signal transmission passage 71 in the embodiment shown in FIG. 5. In order to allow the display units 50 to respectively carry out individual rewrite processing by using single common signal transmission passage 71, it is sufficient that addresses are defined with respect to the display units. In the case where fifty display units are disposed as shown in FIG. 5, for example, addresses from the first address up to the fiftieth address are respectively defined with respect to the display units and these addresses are stored in the memories 52 within the respective display units. In more practical sense, address information of the "first address" is written in advance in the non-volatile memory 52 within the first display unit, and address information of the "fiftieth address" is written in advance in the non-volatile memory 52 within the fiftieth display unit.

Figure 7:
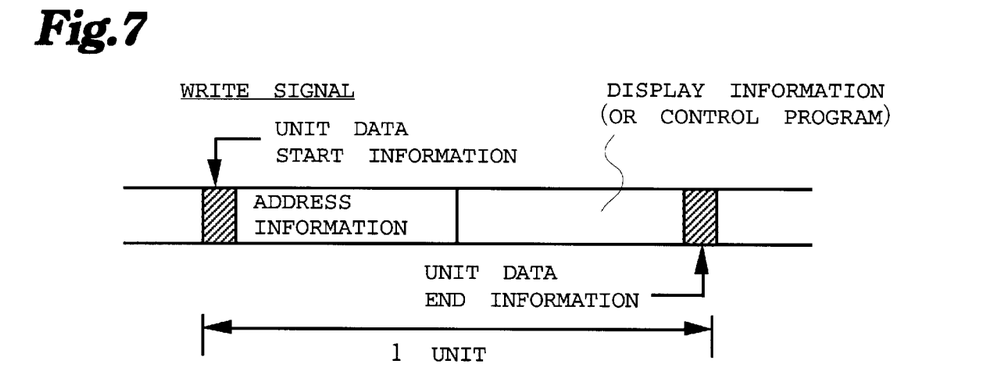
FIG. 7 is a view showing one example of format of write signal delivered from the central control device 70 in the device shown in FIG. 5.

In this case, the write signal transmitted through the signal transmission passage 71 is caused to consist of address information indicating a specific display unit and display information to be newly written into the memory 52 within the specific display unit. FIG. 7 is a view showing one example of the format of a write signal as stated above, wherein a write signal with respect to the specific display unit consists of "unit data start information" indicating start of the write signal of one unit, "address information" indicating the specific display unit, "display information" to be newly written, and "unit data end information" indicating end of the write signal of one unit.

For example, in the case where there is a need to replace former display information stored in the memory within the third display unit with new display information "11001100 . . . ", it is sufficient to generate a write signal including data of "address information: the third address, display information: 11001100 . . . " at the central control device 70 to transmit it to all the display units through the signal transmission passage 71. The controllers 53 within the respective display units are preprogrammed to execute the rewrite processing only in the case where the own address information assigned to the corresponding controller, which is stored in the memory 52, and address information within the transmitted write signal are in correspondence with each other. When such a preprogram is made, even if the above-mentioned write signal is transmitted to all the display units 50, only the controller 53 within the third display unit 50 in which address information of the "third address" is written in the memory 52 executes the processing to replace the display information in the memory 52 by the new display information "11001100 . . . ". Although the same write signal is transmitted to the other forty-nine display units, the controllers 53 within those forty-nine display units do not carry out rewrite processing by any means. It is to be noted that, in order to carry out rewrite operation with respect to plural display units, it is sufficient to repeatedly deliver a write signal as shown in FIG. 7 with address information being respectively changed.

The central control device 70 and the controllers 53 within the respective display units are units including microprocessors, and ordinarily have a function to execute various arithmetic processing in a time of the order of microsecond or less than that. Accordingly, the above-described memory rewrite processing can be executed in such time of the order of microsecond. On the contrary, it is sufficient that a unit time for changing the display mode of the display element 10 (1 sec. in the case of the above-described example) is set to a time to such a degree that the naked eye of human being follows change (the order of millisecond to second). Since the time required for the memory rewrite processing (the order of microsecond) is very short as compared to the switching period of the display mode (the order of millisecond to second), even if the memory rewrite processing is added, any obstruction does not take place in the ordinary switching processing of the display mode that the controller 53 carries out.

In the device to which such a memory rewrite function is added, the number of still pictures to be displayed or the presentation time of moving picture to be displayed is not limited by the memory capacity. If display information in the memory are sequentially rewritten, it becomes possible to carry out, from a theoretical point of view, presentation of infinite number of still pictures or presentation of moving picture of an infinite time.

Figure 8:
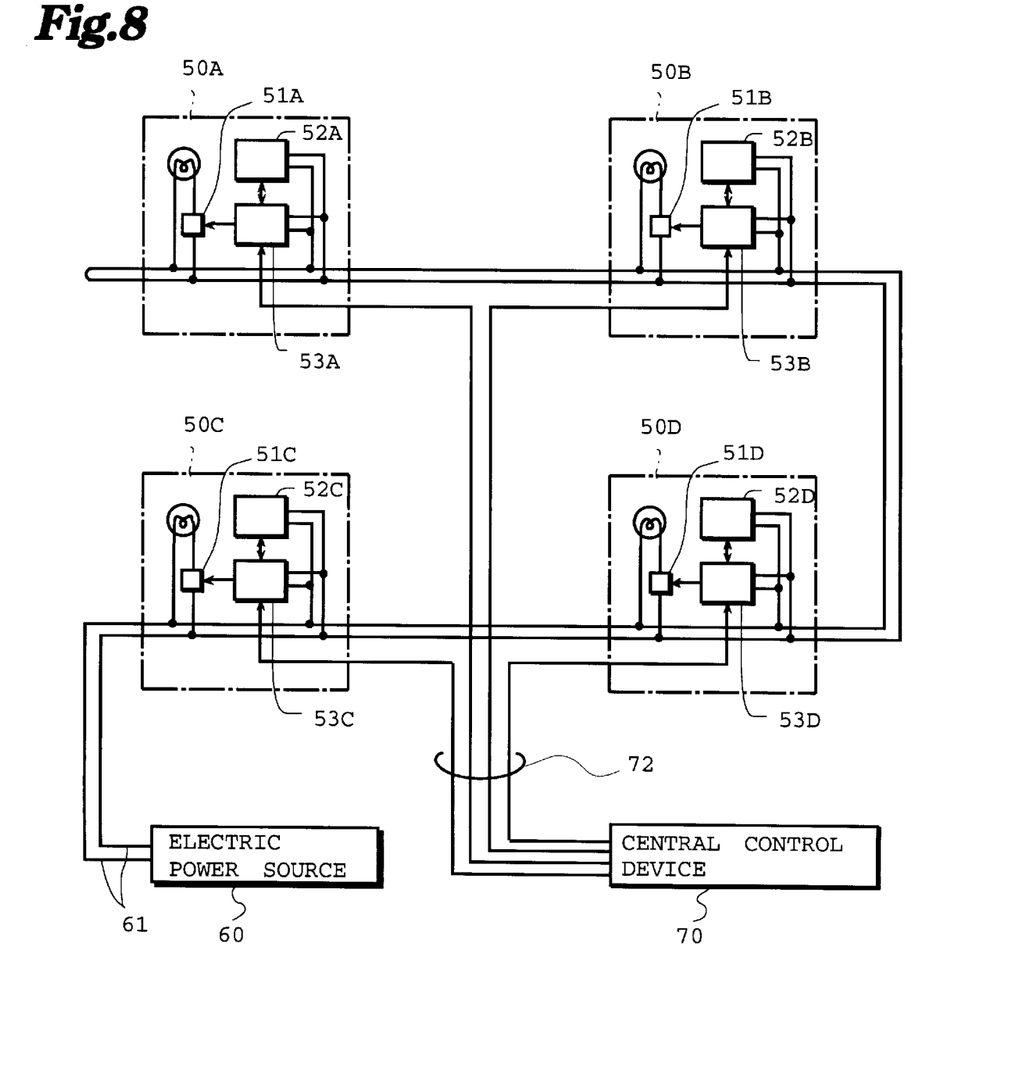
FIG. 8 is a circuit diagram of an embodiment in which plural signal transmission passages for connecting the central control device and respective display units are provided.

It is to be noted that although, in the above-described embodiment, the same write signal is delivered to all the display units through the single common signal transmission passage 71. in the case where a relatively small number of display units are provided, respective dedicated signal transmission passages may be provided for the respective display units. FIG. 8 is a circuit diagram showing an embodiment in which respective dedicated signal transmission passages 72 are drawn from the central control device 70 to four display units 50A, 50B, 50C, 50D. The four signal transmission passages 72 are respectively directly connected to controllers 53A, 53B, 53C, 53D within the display units. In the case where the dedicated signal transmission passages 72 are provided as described above, the address information within the write signal becomes unnecessary, thus making it possible to deliver the write signal at a higher speed.

§4. Embodiment Applied to Color Display

Figure 9:
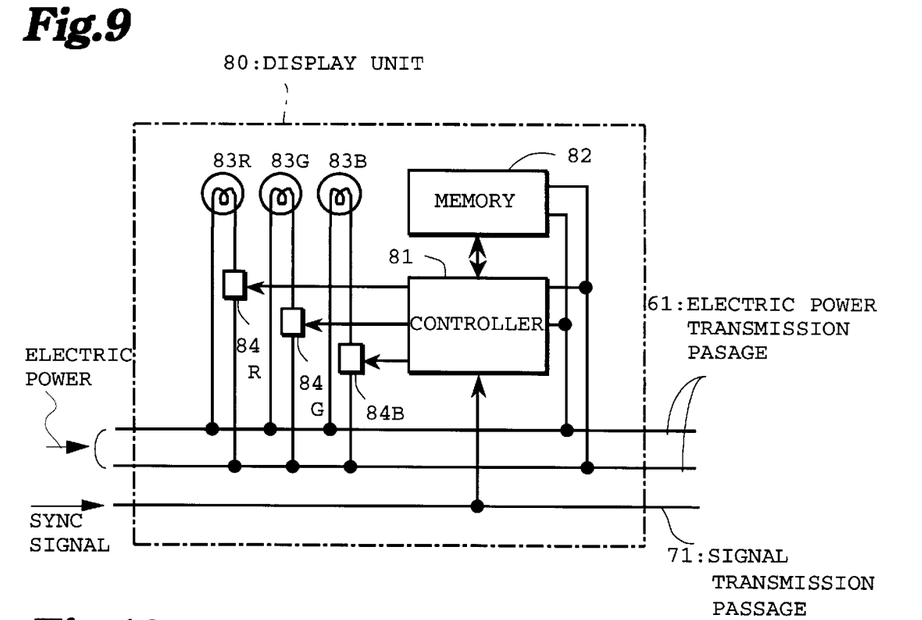
FIG. 9 is a circuit diagram of display unit 80 having display function of R, G, B three primary colors.

Subsequently, the embodiment in which this invention is applied to the color display using light emitting diode will be described. FIG. 9 is a circuit diagram of a display unit 80 having display function of R, G, B three primary colors, and FIG. 10 is a partial front view showing the configuration of a color display 100 of a structure in which a large number of such display units are arranged in a matrix form.

As indicated in the circuit diagram of FIG. 9, three light emitting diodes 83R, 83G, 83B are included as respective display elements within one display unit 80. These light emitting diodes are diodes supplied with electric power from the electric power transmission passage 61 and respectively carry out light emitting operations of three primary colors of red, green and blue. By these three light emitting diodes, color display corresponding to one pixel can be carried out. Power supplies with respect to the light emitting diodes 83R, 83G, 83B are respectively controlled by regulators 84R, 84G, 84B. The controller 81 gives instructions to the respective regulators 84R, 84G, 84B on the basis of display information stored in a non-volatile memory 82. The respective regulators control energizing to the respective light emitting diodes on the basis of these instructions. In this example, the controller 81 is supplied with a synchronizing (SYNC) signal through the signal transmission passage 71. Thus, changes of the display modes of the respective display units are caused to take place in response to (in synchronism with) the synchronizing signal.

Accordingly, it is necessary to respectively store display information in the memory 82 for every respective light emitting diodes. If a relay is used as a regulator to carry out simple ON/OFF control, it is sufficient to prepare one bit of data for each light emitting diode for indicating the display state during one unit time. If a transistor is used as a regulator to carry out control with brightness changes of, e.g., 256 stages of gradation, it is sufficient to prepare eight bits of data for each light emitting diode for indicating the display state during one unit time.

Figure 10:
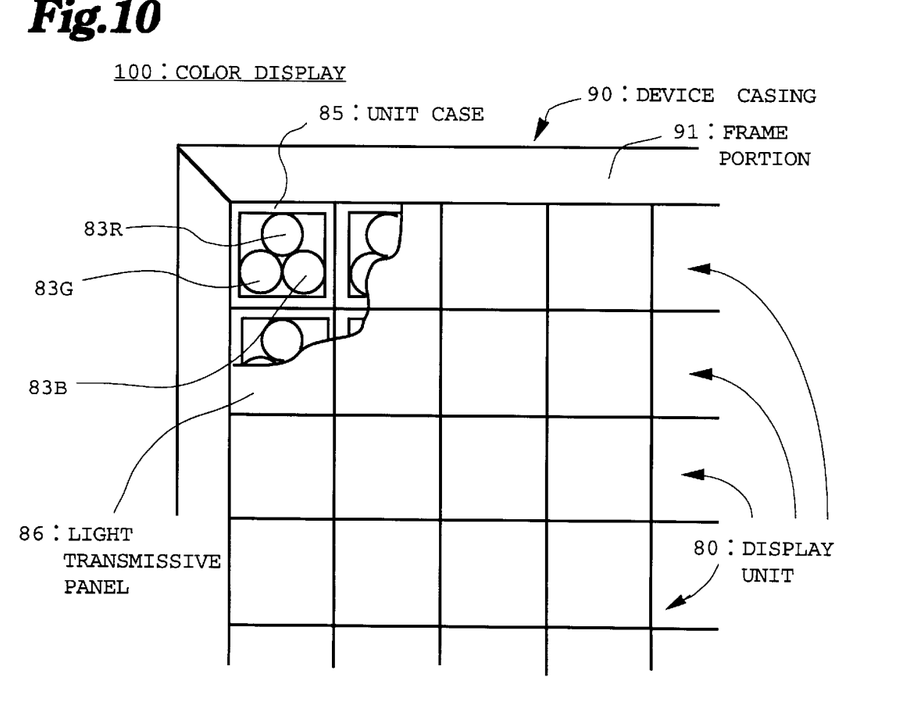
FIG. 10 is a partial front view showing the configuration of color display 100 of a structure in which the display units 80 shown in FIG. 9 are arranged.

As shown in FIG. 10, the respective display units 80 are regular square when viewed from the front, and three light emitting diodes 83R, 83G, 83B are accommodated within a unit case 85 functioning as an envelope. Although not shown in FIG. 10, other components shown in the circuit diagram of FIG. 9 are accommodated as electronic parts within the unit case 85. On the front of the unit case 85, a light transmissive panel 86 is attached. When viewed from the front, the three light emitting diodes 83R, 83G, 83B are accommodated behind the light transmissive panel 86. The display units 80 of such a structure are housed in the state arranged in length and breadth directions within the device casing 90. The device casing 90 includes a rectangular frame portion 91 (only one portion of the left and upper portion thereof is shown in FIG. 10), and a bottom portion (which is not shown in FIG. 10) formed on the bottom surface thereof so as to cover the inside opening portion of the frame portion 91. A large number of display units 80 are put and arranged on the bottom portion.

In this example, the color display 100 further includes, although not shown in the figure, electric power source 60, electric power transmission passage 61 for delivering electric power to the respective display units 80, central control device 70 and signal transmission passage 71 for delivering the synchronizing signal to the respective display units 80. Of course, a write signal can be delivered through the signal transmission passage 71, thereby also making it possible to rewrite display information in the memory 82. If display information is sequentially rewritten, an arbitrary color picture can be displayed similarly to the conventional typical color display.

Figure 11:
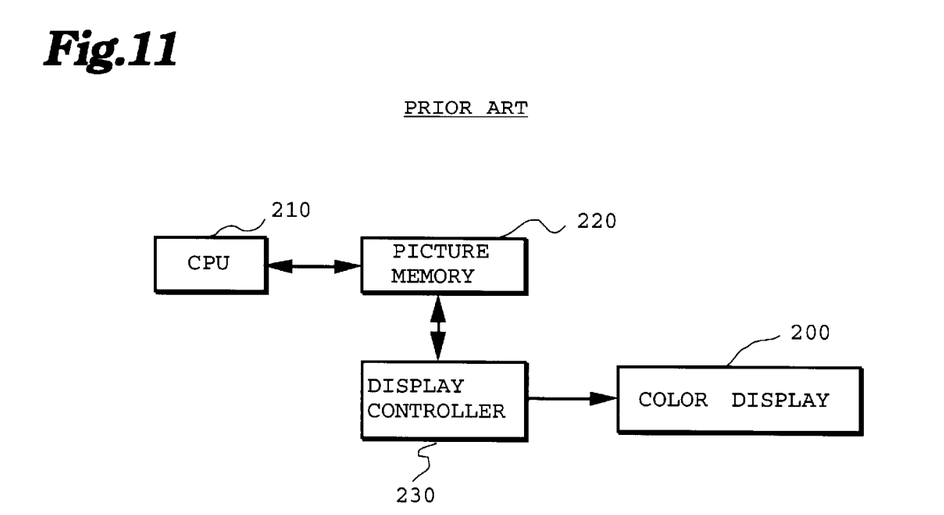
FIG. 11 is a block diagram showing a drive system of a conventional typical color display.

FIG. 11 is a block diagram showing the drive system of a conventional typical color display 200. When picture data is written into a picture memory 220 (so called frame buffer) by a CPU 210, a display controller 230 delivers a predetermined video signal to the color display 200 so as to carry out picture display corresponding to the picture data. This is the conventional typical color display drive method. In accordance with this method, according as the screen size of the color display 200 becomes greater, or the resolution of picture on screen becomes higher, the memory capacity required for the picture memory 220 is increased to more degree. As a result, high access speed is required. In addition, high speed and high grade processing ability is required also for the display controller 230.

Figure 12:
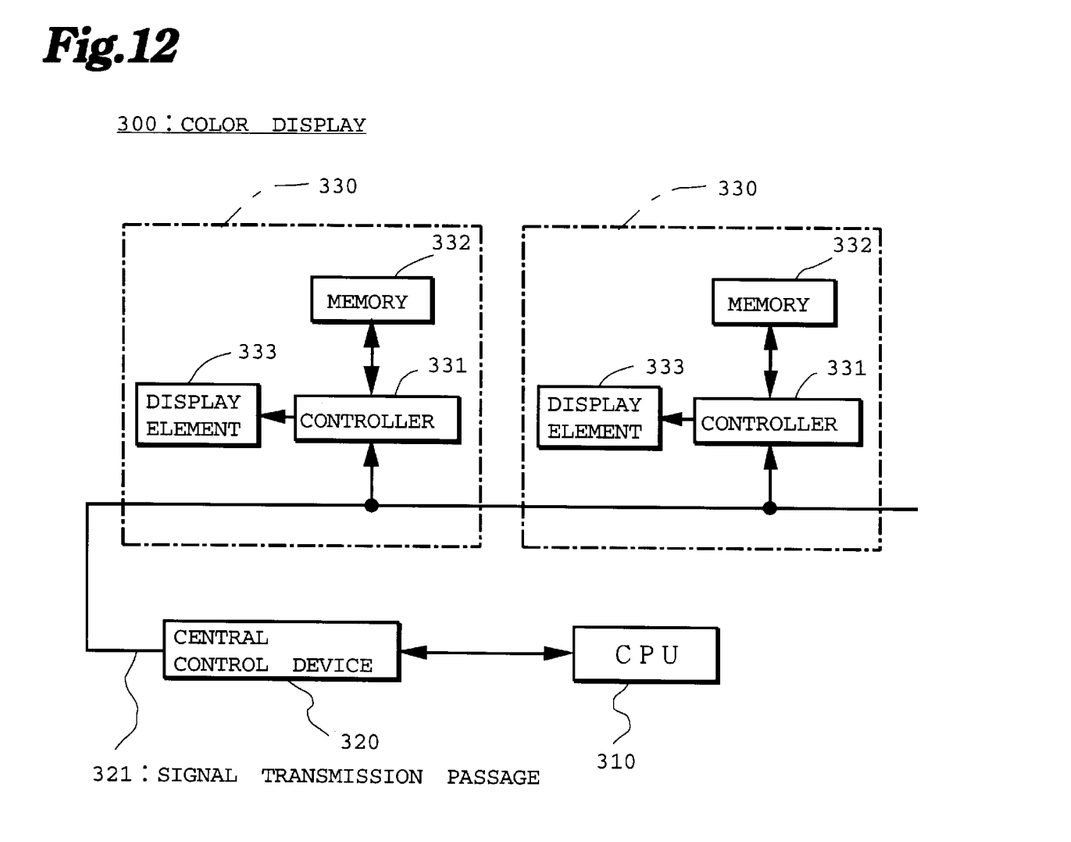
FIG. 12 is a block diagram showing an embodiment in which color display is constituted by using the display device according to this invention.

On the contrary, in the case where this invention is applied to the color display, it becomes unnecessary to provide large capacity picture memory 220 and enhanced function display controller 230. FIG. 12 is a block diagram showing main components in the case where the display device according to this invention is used to constitute the color display. The major portion of the color display 300 is composed of plural display units 330. The main components of each display unit 330 are a controller 331, a memory 332 and a display element 333. Within each display unit 330, the controller 331 carries out processing to control display mode of the display element 333 on the basis of display information stored in the memory 332, and is operative so that when a write signal is given through a signal transmission passage 321 from a central control device 320. Further, the controller 331 carries out processing to rewrite display information in the memory 332 on the basis of the above-mentioned write signal.

The central control device 320 carries out a processing to generate a predetermined write signal on the basis of instruction from a CPU 310 to deliver it to the respective display units 330. As previously described, the transfer time of the write signal between the central control device 320 and the respective display units 330 is the order of microsecond and is sufficiently short as compared to the period that the controller 331 changes the display mode of the display element 333 (order of millisecond to second). Accordingly, even if the rewrite processing with respect to the memory 332 is added, any obstruction does not take place in the ordinary display processing. Moreover, since the memory 332 within each display unit 330 is only required to have a capacity sufficient for only holding display information with respect to the area which the own memory is in charge of among the entire picture area as a color display, there is no necessity for the memory 332 to use a memory element with large capacity or high access speed. Similarly, since the controller 331 within each display unit 330 is only required to have a function to merely carry out control with respect to the area which the own controller is in charge of among the entire picture area as the color display, a high grade arithmetic processing ability is not required as the controller 331. As stated above, according to this invention, the burden of the memory 332 and the controller 331 within each display unit in the color display becomes light to such a degree, because an area which each component is in charge of is reduced as compared to the picture memory 220 and the display controller 230 in the conventional color display drive system. As a result, those components can be constituted with relatively inexpensive electronic parts.

§5. Other Modifications

While this invention has been described in accordance with the illustrated embodiments, this invention is not limited to these embodiments, but may be carried out in various modes in addition to the above described mode. Several modifications are indicated below.

(1) While light bulbs or light emitting diodes are used as individual display elements in the above-described embodiments, the display elements in the fundamental idea. of this invention are not limited only to such light emitting elements. For example, there may be employed a panel type display element, etc. having a structure of three-dimensional body with plural display surfaces wherein a specific display surface can be selectively presented at a time by rotating the body by motor, etc. In short, this invention may be applied to any display devices in which a large number of display elements are arranged on a screen as pixels and respective display elements have a function to vary their own display mode using electric power drive system to thereby carry out display of information on the screen.

(2) The non-volatile memory and the controller are respectively prepared by EEPROM and microprocessor, etc., in the above-described embodiments. However, any memory having the property to hold storage content also after the power supply is turned OFF may be used as the non-volatile memory. As the controller, if the component having function as described above is provided, the wired logic circuit or the transistor circuit may be used. Further, as the non-volatile memory, not only so called semiconductor memory, but also element for mechanically storing information, e.g., DIP switch, etc. may be used. In addition, if it is the premise that rewrite operation of display information is carried out through the signal transmission passage, the memory portion in which display information is stored may be constituted with volatile memory such as RAM, etc.

(3) As previously described, the electric power transmission passage 61 and the signal transmission passage 71 may be caused to be commonly used to transmit electric power and display signal in the superimposed state by way of physically the same conductive wire. Moreover, it is not necessarily required to use physical conductive wire for transmitting electric power or display signal to respective display units. For example, supply of electric power or display signal may be also carried out by magnetic coupling, and display signal may be also delivered to respective display units by utilizing radio or light (e.g., infrared ray). Particularly, if optical fiber is used as the signal transmission passage 71, it becomes possible to transmit the write signal at a high speed. In addition to this, even if the number of display units is increased, drawback such as voltage drop, etc. does not take place.

(4) While one pixel is constituted by a single display unit in the above-described embodiments, a plurality of display elements corresponding to plural pixels may be included within a single display unit. While, in the embodiment shown in FIG. 10, for example, three light emitting diodes 83R, 83G, 83B are included within a single display unit 80 to carry out display of one pixel by these three light emitting diodes, e.g., a group in which these display units 80 are arranged in a matrix form of four rows by four columns may be handled as a single display unit. In this case, sixteen sets of pixel component each comprised of three light emitting diodes are provided within the single display unit so that forty-eight light emitting diodes in total and forty-eight regulators in total are included therewithin. In such a configuration, it is still sufficient to provide single memory and single controller for the single display unit, since display information with respect to respective forty-eight light emitting diodes can be stored into the single memory.

(5) While, in the above-described embodiments, the controller within each display unit executes a processing determined in advance (display processing to control respective regulators on the basis of display information in the memory and processing to rewrite display information in the memory when the write signal is given), if a design is made such that the controller executes these processing by making reference to a predetermined control program stored in the memory, an approach may be employed to rewrite the control program in the memory to thereby suitably change the processing content of the controller.

For example, in the circuit diagram shown in FIG. 6, it is sufficient to store, in advance, both the display information and the control program in the memory 52 within the display unit 50. The controller 53 executes the control program stored in the memory 52 to thereby execute display processing to control the regulator 51 and processing to rewrite the display information in the memory 52 on the basis of the write signal delivered from the signal transmission passage 71. If a given write signal includes an instruction for rewriting display information, a rewrite operation of the display information in the memory 52 is executed and the display mode of the display element 10 is changed as has been described in the aforesaid embodiments. On the other hand, if a given write signal includes an instruction for rewriting control program, a rewrite operation of the control program in the memory 52 is executed and the processing operation itself of the controller 53 can be changed.

Of course, by giving a write signal with a respective address in the case of carrying out rewrite operation of the control program, different rewrite operations of control programs for respective display units can be carried out, even if a common signal transmission passage is used.

(6) As the controller within each display unit, any device having a function capable of controlling the regulator on the basis of display information in the memory may be used. For example, the controller may be constituted by a gate array or a PLA element. It is to be noted that if a device having arithmetic processing function is used as a controller, data within the write signal delivered through the signal transmission passage 71 can be transmitted in the compressed state. For example, in the case of transmitting a write signal as shown in FIG. 7 from the central control device 70, data of the portion of the display information can be compressed in advance. In the case where such a transmission of compressed data is carried out, the controller 53 shown in FIG. 6 receives display information in the compressed state. In this instance, if processing program for expanding the compressed data is included in advance (or is stored in the memory 52), the received compressed data may be expanded to store it into the memory 52. Alternatively, such an approach may be employed that the controller 53 stores display information into the memory 52 in the compressed state when it received and it expands the stored compressed data when it reads out every time to carry out the actual display. Such a data compression is effective particularly in the case of presenting moving picture.

Further, data may be changed to coded data. For example, let consider the case where sixty-four light bulbs arranged in eight by eight matrix are included as display elements within one display unit. Then a hundred of such display units are arranged in ten by ten matrix to constitute an electric bulletin board. In this case, one letter (character) of alphabetic figure consisting of eight by eight dots can be displayed by one display unit. Thus, display of a hundred letters (characters) can be made as the entirety of the electric bulletin board. On the other hand, display information with respect to sixty-four light bulbs are respectively stored in the memories within the display units. In such a case, bit map data of specific letters (characters) consisting of sixty-four bits (data designating light emitting or non-light emitting state with respect to respective sixty-four light bulbs) are stored into the memory as display information. In place of this, ASCII code, etc. of a specific letter (character) can be also stored as display information. Since the controller 53 has the arithmetic processing function, it is sufficient to carry out decoding work for expanding bit map data of an eight by eight matrix on the basis of the ASCII code which has been read out from the memory 52. If coded data is used in place of actual picture data (bit map data) as described above, data capacity of the write signal delivered through the signal transmission passage from the central control device can be reduced.

Moreover, function to carry out thinning processing or interpolation processing between or with respect to pixels may be added to the controllers within respective display units. This is effective in the case where a resolution of pixel arrangements of plural display elements in the display unit and a resolution of display information stored in the memory are not in correspondence with each other. For example, let consider the case where sixty-four light bulbs arranged in eight by eight matrix are included as display elements within one display unit. There is no problem in the case where display information in the memory is picture information similarly having the resolution of eight by eight. However, in the case where that display information is picture information having resolution of sixteen by sixteen, it is sufficient to execute thinning processing of pixels at the controller to reduce the resolution so that eight by eight is provided. In contrast, in the case where display information in the memory is picture information having resolution of four by four, it is sufficient to execute interpolation processing of pixels at the controller to increase the resolution so that eight by eight is provided.

In addition, not only the above-described spatial thinning processing or interpolation processing, but also the thinning processing or the interpolation processing in point of time can be carried out. For example, in the case where display information in the memory is moving picture information which varies the display state every 1 sec, an approach may be employed at the controller to thin such moving picture information into ½ to vary the display state every 2 sec, or to carry out interpolation in a manner opposite to the above to generate an intermediate display state to vary the display state every 0.5 sec.

Industrial Applicability

A display device according to this invention can be widely utilized for electric bulletin boards or large display devices in which a large number of light bulbs, light emitting diodes or rotational panels are arranged. Particularly, this display device can be utilized as a display for advertising propaganda in the place where people are gathered such as station or plaza, etc. Such a utilization form to repeatedly present a moving picture of several minutes can be made. In addition, if the display device itself of this invention is utilized as a part of architecture such as a wall, etc., the architecture can provide an intelligent illuminating function.

What is claimed is:

1. A display device comprising:
   an array of display units;
   display elements respectively in the display units for light-emitting operation;
   memories respectively in the display units for storing variable display sequence information that designates the light-emitting operation of the respective display elements; and
   controllers respectively in the display units for determining the light-emitting operation of the respective display elements on the basis of the display sequence information that designates the light-emitting operation of the respective display elements so that the display elements carry out the light-emitting operation designated by their respectively associated memories.

2. The display device as set forth in claim 1:
   wherein at least one of the display elements is a first color presentation element (83R) for presenting a first primary color, a second color presentation element (83G) for presenting a second primary color and a third color presentation element (83B) for presenting a third primary color.

3. The display device as set forth in claim 1, and further comprising:
   a control device (70; 320) for generating a synchronizing signal; and
   signal transmission means (71; 321) for delivering the synchronizing signal to the controllers;
   wherein the controllers determine the emitting from a time synchronized with the synchronizing signal delivered thereto.

4. The display device as set forth in claim 1, and further comprising:
   a control device (70; 320) for generating a write signal; and
   signal transmission means (71; 321) for delivering the write signal to the memories to rewrite the display sequence information thereof on the basis of the write signal delivered thereto.

5. The display device as set forth in claim 4:
   wherein first addresses for the respective display units are stored in the respective memories; and
   wherein the write signal comprises second addresses to rewrite the display sequence information of the memories when the first and second addresses correspond.

6. The display device as set forth in claim 1, and further comprising:
   a device (70; 320) for generating a write signal; and
   signal transmission means (71; 321) for delivering the write signal to the memories;
   wherein the memories store further display sequence information and substitute the further display sequence information for the display sequence information on the basis of the write signal delivered thereto.

7. The display device as set forth in claim 6:
   wherein first addresses for the respective display units are stored in the respective memories; and
   wherein the write signal comprises second addresses to substitute the further display sequence information when the first and second addresses correspond.

8. The display device as set forth in claim 3:
   wherein the signal transmission means also supplies electric power to the display units.

9. The display device as set forth in claim 4:
   wherein the write signal is compressed or encoded in the control device and expanded or decoded within the controller.

10. The display device as set forth in claim 4:
    wherein the controllers carry out thinning processing or interpolation processing with respect to the display sequence information stored in the respective memories.

11. The display device as set forth in claim 2, and further comprising:
    a control device (70; 320) for generating a synchronizing signal; and signal transmission means (71; 321) for delivering the synchronizing signal to the controllers;

wherein the controllers determine the emitting from a time synchronized with the synchronizing signal delivered thereto.

12. The display device as set forth in claim 2, and further comprising:

a control device (70; 320) for generating a write signal; and signal transmission means (71; 321) for delivering the write signal to the memories to rewrite the display sequence information thereof on the basis of the write signal delivered thereto.

13. The display device as set forth in claim 3, and further comprising:

a control device (70; 320) for generating a write signal; and signal transmission means (71; 321) for delivering the write signal to the memories to rewrite the display sequence information thereof on the basis of the write signal delivered thereto.

14. The display device as set forth in claim 11, and further comprising:

a control device (70; 320) for generating a write signal; and signal transmission means (71; 321) for delivering the write signal to the memories to rewrite the display sequence information thereof on the basis of the write signal delivered thereto.

15. The display device as set forth in claim 13:

wherein first addresses for the respective display units are stored in the respective memories; and wherein the write signal comprises second addresses to rewrite the display sequence information of the memories when the first and second addresses correspond.

16. The display device as set forth in claim 2, and further comprising:

a device (70; 320) for generating a write signal; and signal transmission means (71; 321) for delivering the write signal to the memories;

wherein the memories store further display sequence information and substitute the further display sequence information for the display sequence information on the basis of the write signal delivered thereto.

17. The display device as set forth in claim 13:

wherein the signal transmission means also supplies electric power to the display units.

18. The display device as set forth in claim 6:

wherein the write signal is compressed or encoded in the control device and expanded or decoded within the controller.

19. The display device as set forth in claim 6:

wherein the controllers carry out thinning processing or interpolation processing with respect to the display sequence information stored in the respective memories.

20. The display device as set forth in claim 7:

wherein the controllers carry out thinning processing or interpolation processing with respect to the display sequence information stored in the respective memories.

21. A display device comprising:

an array of display units, each of the display units comprising:

a display element for light-emitting operation;

a memory for storing predetermined particular display sequence information that designates the light-emitting operation of the display element; and a controller for determining the light-emitting operation of the display element on the basis of said predetermined particular display sequence information stored in the memory so that the display element carries out the light-emitting operation.

22. Method for operating a display device comprising steps of:

a first step of preparing a display device comprising an array of display units, each of the display units comprising a display element for light-emitting operation, a non-volatile memory for storing data and a controller for controlling the display element based on data in the non-volatile memory;

a second step of preparing inherent display sequence information designating light-emitting operation for the respective display elements and storing said inherent display sequence information to the corresponding non-volatile memory as data; and a third step of functioning the respective controllers so that the respective display elements carry out the light-emitting operation based on data stored in said second step in the corresponding non-volatile memories;

wherein said second step is carried out in advance before said third step is carried out.

23. A display device comprising:

an array of display units, each of the display units comprising:

a display element for light-emitting operation;

a memory for storing variable display sequence information that designates the light-emitting operation of the display element; and a controller for determining the light-emitting operation of the display element on the basis of the display sequence information that designates the light-emitting operation of the display element so that the display element carries out the light-emitting operation designated by the memory.

* * * * *